Figure 1:
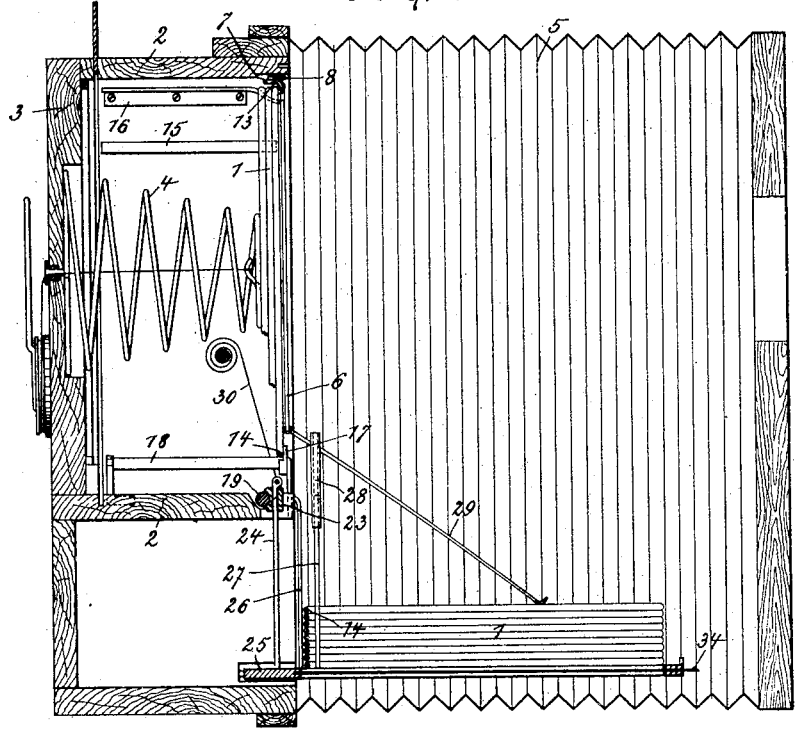

No. 669,971. Patented Mar. 19, 1901.
J. ADLER.
MAGAZINE CAMERA.
(Application filed Sept. 11, 1900.)

(No Model.) 3 Sheets—Sheet 1.

WITNESSES:

INVENTOR
Josef Adler
BY
ATTORNEYS

No. 669,971. Patented Mar. 19, 1901.
J. ADLER.
MAGAZINE CAMERA.
(Application filed Sept. 11, 1900.)

(No Model.) 3 Sheets—Sheet 2.

WITNESSES:
Ella L. Giles
Otto—

INVENTOR
Josef Adler
By Richardson
ATTORNEYS

THE NORRIS PETERS CO., PHOTO-LITHO., WASHINGTON, D. C.

No. 669,971. Patented Mar. 19, 1901.
J. ADLER.
MAGAZINE CAMERA.
(Application filed Sept. 11, 1900.)
(No Model.) 3 Sheets—Sheet 3.
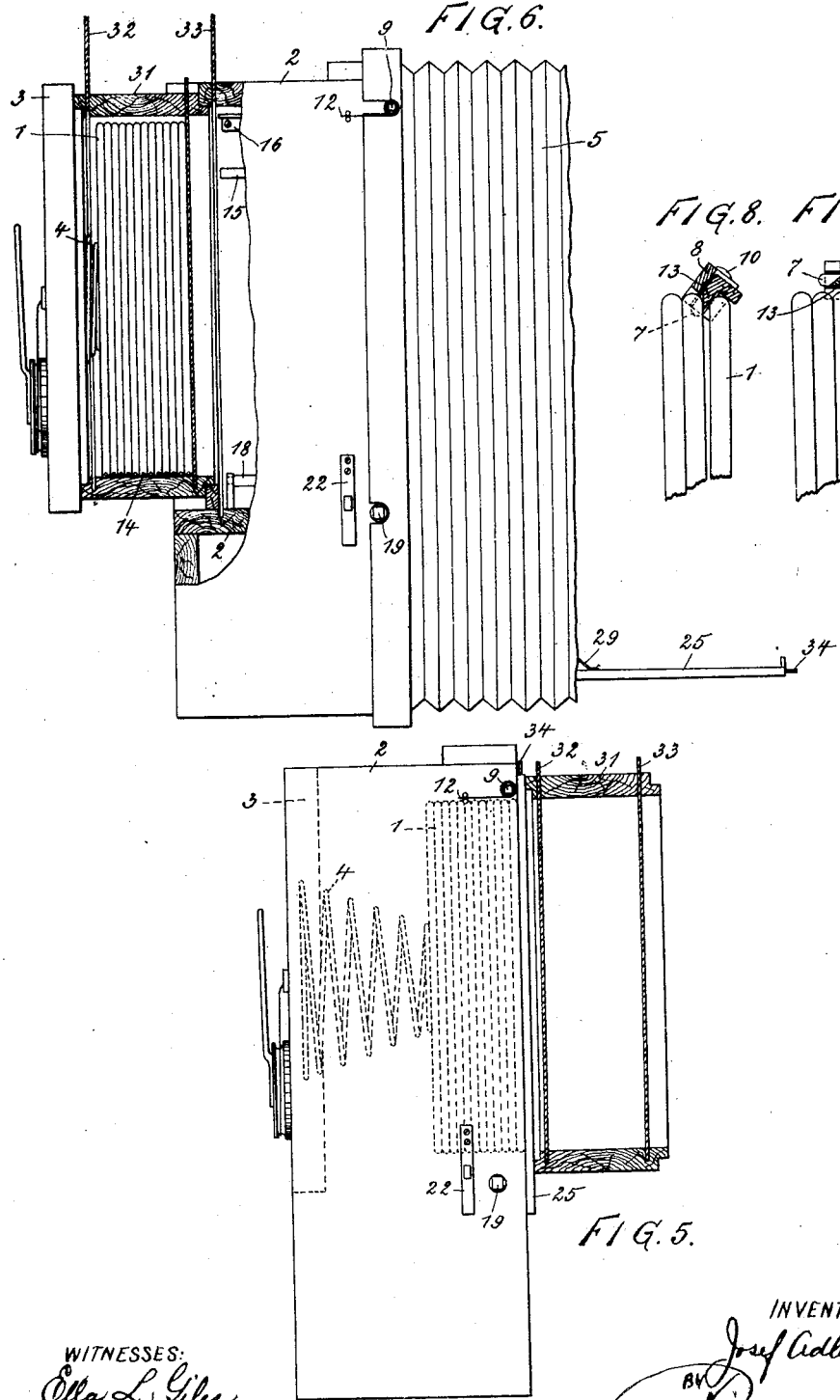

UNITED STATES PATENT OFFICE.

JOSEF ADLER, OF BERLIN, GERMANY.

MAGAZINE-CAMERA.

SPECIFICATION forming part of Letters Patent No. 669,971, dated March 19, 1901.

Application filed September 11, 1900. Serial No. 29,684. (No model.)

*To all whom it may concern:*

Be it known that I, JOSEF ADLER, M. D., a subject of the German Emperor, and a resident of No. 23 Culmstrasse, Berlin, in the Empire of Germany, have invented a certain new and useful Improved Photographic Camera in which the Plates are Changed within the Bellows, of which the following is an exact, full, and clear description.

This invention relates to an improved photographic bellows-camera in which the changing of the plates takes place within the bellows in such a manner that after the exposure the single plates are released by an oscillating frame, whereupon on being positively guided within the bellows they drop upon a frame which when the camera is not in use must be raised with the exposed plates and inserted with the latter in the plate-box portion of the camera against the tension of springs. Consequently the exposed and unexposed plates remain apart from each other, so that the slidable frame, which is to be pushed down into the pulled-out bellows, only takes with it the exposed plates for obtaining a view or picture on the next unexposed plate that is automatically inserted in the camera-box at the focal distance from the objective.

This camera has the great advantage over the box-camera that when not in use it is reduced in length to the extent of the focal distance, while when compared with known bellows-cameras the advantage exists that the plates can be changed without using light-tight sleeves or similar devices, since such changing takes place within the bellows. The dimension of the box for the camera-plates and of the bellows connected thereto is increased in the one direction to the extent of the thickness of a set of plates to be used simultaneously in the camera, since the plates must be changed from their vertical position behind one another in the box into the horizontal position over one another in the bellows and a space in the latter equivalent to the size of a plate must of course be provided for each plate.

To the camera belongs a frame or box for the plates, which is provided on both sides with slides and allows of the removal of the pile of exposed plates from the camera and the insertion of a fresh set of plates without dark room or the like.

Figure 2:
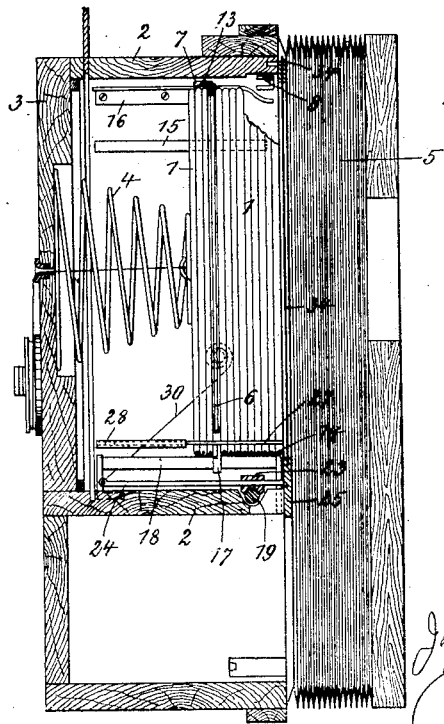
Figure 3:
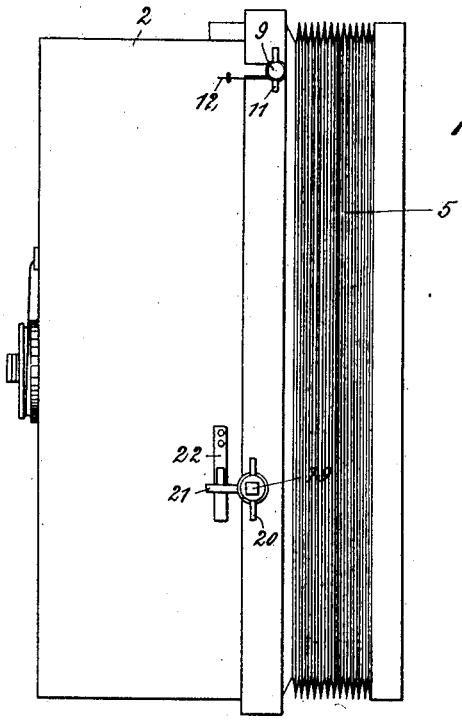
Figure 4:
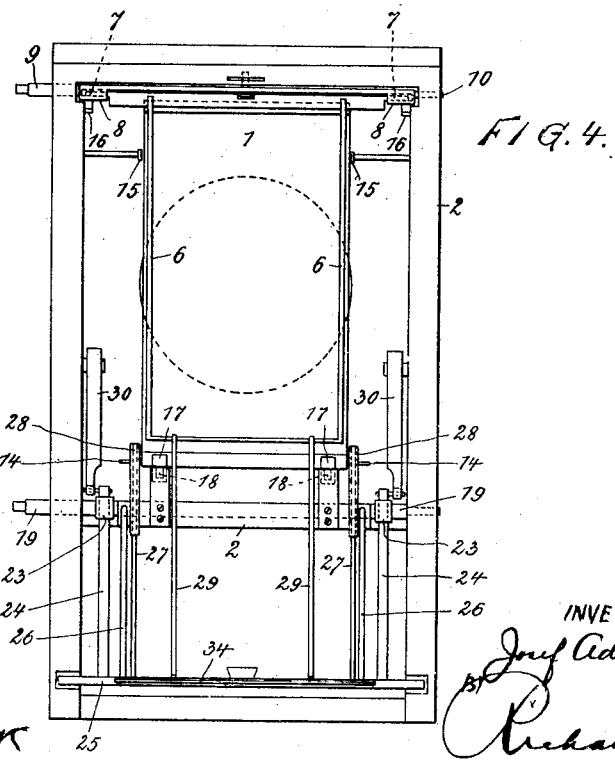

Referring to the accompanying drawings, Figure 1 is a vertical longitudinal section through such a camera—for instance, twelve plates, of which nine are already exposed and therefore put in the bellows, while three (shown partly broken) plates are still located in the camera-box for exposure. Fig. 2 is a vertical section through the camera and plates according to Fig. 1, with inserted plates and compressed bellows. Fig. 3 is an exterior view of the camera according to Fig. 2. Fig. 4 is a front elevation of the camera with removed bellows. Figs. 5 and 6 show, respectively, the removal of the exposed and the insertion of a fresh set of plates by means of a special frame. Figs. 7 and 8 are details in section and on a larger scale of the upper part of the oscillating or swing frame, which lays aside the exposed plates singly and retains the remaining unexposed plates.

The camera consists of a box 2, corresponding to the dimensions of the pile of plates 1 to be employed, such box being shut off behind by a lid or cover 3, whose spring 4 forces the plates to the front, so that the first plate is always located at the focal distance from the objective (not shown) provided in the bellows 5 in the known manner. The plates 1, with the known sheet-metal framing or the like, are located in the box 2 behind one another. After exposure they are changed singly by means of an oscillating frame 6, whose lateral pivots 7 are provided in a rail 8 of U shape at the ends. This rail 8 is provided at the ends with pivots 9 10, rotatably mounted in the walls or sides of the box. The pivot 9 projects laterally and is provided on a square part with a key or a handle 11 and also with a spring 12, which after rotation of the rail for oscillating the frame 6 returns the latter to its vertical position. Through the forward oscillation of the frame the front plate is released after the rail 8 has been turned to such an extent that the horizontal cross-piece of the upper rail 13 of the frame 6 is located behind the plate to be changed, thereby releasing this plate and serving at the same time as support for the rear pile of unexposed plates. The released plate is now tilted forward, while turning on its lower edge, which is provided at the sides with pins or hook attachments 14, that regulate the falling of the changed plate.

The rails 15 at the opposite side walls of the box serve as guides for the plates during their feed into the exposure position, while the upper rails 16 are provided at the front ends with bent attachments, which support the upper part 13 of the oscillating frame after its turning movement for the changing of plates. The lower edge of the front plate 1 abuts against studs 17, sliding horizontally on pins 18. These studs or abutments 17 and the oscillating frame 6, sliding with its upper rail 13 on the cross-piece of the rail 16, form the division of the exposed and unexposed plates during the folding of the camera, which is effected by the construction to be described later on.

At the bottom of the box 2 for the plates a shaft 19 is rotatably mounted in the walls of the box. The end protruding at one side and provided with a square part receives a key 20, by which the shaft 19 can be turned and whose arm 21, engaging below the catch of a flat spring 22, effects the adjustment of the shaft 19 after a quarter-rotation in the one direction. On the shaft 19 are provided guide-sleeves 23, in which the bearing-rods 24 of a plate 25 are guided, which serves as support for the exposed and changed plates and when using the camera is in a horizontal position within the bellows, Fig. 1. On the plate 25 are also secured abutment-rails 26 for the lower edges of the exposed plates 1, whose pins or hook attachments 14 are guided during the dropping of the plates on pins 27, which are likewise secured to the plate 25 and are extended upward by suitably-suspended tubes 28, sliding on the pins, so that the plates during the tilting movement on their lower edge by the abutments 14 of the frame surrounding the tubes 28 and pins 27, respectively, are immediately and positively guided and collected in a regulable pile with the plate 25.

After a quarter-rotation of the shaft 19, by which the plate 25 and the pile of exposed plates carried by the latter, and preferably held down on the oscillating frame 6 by a spring-wire 29, are guided in the vertical position, this plate 25, together with the exposed plates, can be moved into the box 2 and secured in this position by suitable ratchet mechanisms releasable from without. During this movement the rods 24 serve as a guide, and springs 30 are connected with the rods, which former are tensioned with the bearing-plate 25 through the insertion of the pile of plates. This position of the rotated shaft 19 is secured by the ratchet-spring 22 holding the arm 21 of the handle 20, such spring being easily released from without for the release and return movement of the shaft 19. After this release of the ratchet-spring 22 the previously-released frame, consisting of the plate 25 and the exposed plates and forced forward by its springs 30, is tilted downward with the shaft 19.

The filling and emptying of the box 2 are preferably effected, as stated, by means of a frame 31, which can receive quite a pile of plates and is provided with grooves or other devices in such a manner that for receiving the pile of exposed plates after removal of the bellows it can be fixed light-tight at the front against the box 2, while the insertion of a pile of fresh plates is effected by means of the same frame 31, which after the removal of the lid or cover 3 with spring 4 is likewise fixed air-tight behind against the box. The frame 31 is provided on both sides with light-tight slides 32 33, of which on the removal of the exposed plates the slide 32, located opposite to the box 2, is drawn upward, so that by the released spring 4 of the lid or cover 3 the plates are pressed into the frame 31, which after the closure of the slide 32 can be removed from the box 2 with all the exposed plates. The insertion of a fresh pile of plates takes place in a similar manner at the other end of the box. After arranging the frame 31 with the fresh plates and securing the lid or cover 3 while the spring 4 is tensioned the whole pile of plates is conveyed into the box 2 by the released spring, after previously drawing upward both slides 32 33. In this manner it is possible to effect without dark room or devices substituted therefor the removal of the exposed plates and the insertion of fresh plates. In order to effect the above-described removal of the pile of exposed plates, the bearing-plate 25 must of course also be provided with a light-tight slide 34.

Having now particularly described and ascertained the nature of the said invention, I declare that what I claim, and wish to secure by Letters Patent, is—

1. In a photographic camera with bellows, the combination of a plate, which is adapted for carrying the photographic plates and may be tilted upward and forced with the photographic plates into the camera, with a device for keeping the exposed and unexposed plates apart, substantially as described and shown in the drawings.

2. In a photographic camera, the combination of a tilting frame with the device for turning the same from without, a rail with which the upper frame-rail engages and with abutments sliding on pins, substantially as described and shown in the drawings.

3. In a photographic camera, the combination of the tilting supporting-plate for the exposed plates with a rotatable shaft to be rendered stationary and sleeves provided on this shaft for guiding the supporting-rods of the tilting plate, substantially as described and shown in the drawings.

4. In a photographic camera, the combination of the frame provided with pins or hook attachments for the photographic plates with guide-pins extended by tubular attachments on the tilting plate, substantially as described and shown in the drawings.

5. In a photographic camera, the combination of the tilting frame for changing the plates within the bellows, with a plate-box, which is provided at both ends with light-tight slides and is adapted for removing the exposed and inserting the unexposed plates, substantially as described and shown in the drawings.

In witness whereof I have hereunto set my hand in presence of two witnesses.

JOSEF ADLER.

Witnesses:
WOLDEMAR HAUPT,
HENRY HASPER.